(12) United States Patent
Qin et al.

(10) Patent No.: US 11,445,200 B2
(45) Date of Patent: Sep. 13, 2022

(54) METHOD AND SYSTEM FOR PROCESSING VIDEO CONTENT

(71) Applicant: ALIBABA GROUP HOLDING LIMITED, Grand Cayman (KY)

(72) Inventors: Minghai Qin, San Mateo, CA (US); Guanlin Wu, San Mateo, CA (US); Tae Meon Bae, San Mateo, CA (US); Sicheng Li, San Mateo, CA (US); Yuanwei Fang, San Mateo, CA (US); Yen-kuang Chen, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/872,614

(22) Filed: May 12, 2020

(65) Prior Publication Data

US 2021/0360258 A1 Nov. 18, 2021

(51) Int. Cl.
| | |
|---|---|
| *H04N 7/12* | (2006.01) |
| *H04N 19/14* | (2014.01) |
| *H04N 19/172* | (2014.01) |
| *H04N 19/117* | (2014.01) |
| *H04N 19/146* | (2014.01) |
| *H04N 19/124* | (2014.01) |
| *H04N 19/159* | (2014.01) |

(52) U.S. Cl.
CPC .......... *H04N 19/14* (2014.11); *H04N 19/117* (2014.11); *H04N 19/124* (2014.11); *H04N 19/146* (2014.11); *H04N 19/159* (2014.11); *H04N 19/172* (2014.11)

(58) Field of Classification Search
CPC .... H04N 19/14; H04N 19/146; H04N 19/159; H04N 19/172; H04N 19/117; H04N 19/124
USPC .................................................. 375/240.02
See application file for complete search history.

(56) References Cited

U.S. PATENT DOCUMENTS

| | | | | |
|---|---|---|---|---|
| 8,270,473 | B2 * | 9/2012 | Chen ..................... | H04N 19/132 375/240.03 |
| 9,100,509 | B1 * | 8/2015 | Jia ......................... | H04N 19/137 |
| 9,225,961 | B2 * | 12/2015 | Chen ..................... | H04N 19/523 |
| 10,419,773 | B1 * | 9/2019 | Wei ....................... | H04N 19/169 |
| 2010/0316126 | A1 * | 12/2010 | Chen ..................... | H04N 19/124 375/240.16 |
| 2011/0280316 | A1 * | 11/2011 | Chen ..................... | H04N 13/161 375/240.25 |
| 2012/0201476 | A1 * | 8/2012 | Carmel .................. | H04N 19/60 382/239 |
| 2013/0293725 | A1 * | 11/2013 | Zhang .................... | H04N 17/02 348/180 |
| 2015/0208045 | A1 * | 7/2015 | Togita .................... | H04N 5/772 348/272 |
| 2016/0086309 | A1 * | 3/2016 | Hsu ....................... | G06T 3/4015 382/162 |

* cited by examiner

*Primary Examiner* — Gims S Philippe
(74) *Attorney, Agent, or Firm* — Finnegan, Henderson, Farabow, Garrett & Dunner, LLP (57) ABSTRACT

Embodiments of the disclosure provide systems and methods for processing video content. The method can include: receiving raw video data of a video; determining a texture complexity for the video based on the raw video data; determining an encoding mode for the raw video data based on the texture complexity; and encoding the raw video data using the determined encoding mode.

17 Claims, 7 Drawing Sheets

METHOD AND SYSTEM FOR PROCESSING VIDEO CONTENT

BACKGROUND

Cloud service can play an important role for distributing video streams over the Internet. For example, an individual can upload a video clip to a personal channel (e.g., a Youku channel or a YouTube channel) or perform on-line live video streaming using the cloud service. Generally, a video can be encoded locally and then uploaded to a cloud system, and a video processing sub-system of the cloud system can decode the encoded video into raw video data. The raw video data can be re-encoded by the video processing sub-system for distribution.

Generally, the video processing sub-system can provide a variety of encoding options. The video processing sub-system then can select an encoding option that fits the raw video data of the video clip, for example, based on characteristics of the raw video data, such as a color feature, a texture feature, a shape feature, and the like. Therefore, evaluation of these characteristics (e.g., texture complexity) can assist the selection of an encoding option for a video.

SUMMARY OF THE DISCLOSURE

Embodiments of the disclosure provide a computer-implemented method for processing video content. The method can include: receiving raw video data of a video; determining a texture complexity for the video based on the raw video data; determining an encoding mode for the raw video data based on the texture complexity; and encoding the raw video data using the determined encoding mode.

Embodiments of the disclosure also provide a system for processing video content. The system can include: a memory for storing a set of instructions; and at least one processor configured to execute the set of instructions to cause the system to: receive raw video data of a video; determine a texture complexity for the video based on the raw video data; determine an encoding mode for the raw video data based on the texture complexity; and encode the raw video data using the determined encoding mode.

Embodiments of the disclosure further provide a non-transitory computer readable medium that stores a set of instructions that is executable by at least one processor of a computer system to cause the computer system to perform a method for processing video content. The method can include: receiving raw video data of a video; determining a texture complexity for the video based on the raw video data; determining an encoding mode for the raw video data based on the texture complexity; and encoding the raw video data using the determined encoding mode.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Particular aspects of the present disclosure are described in greater detail below. The terms and definitions provided herein control, if in conflict with terms and/or definitions incorporated by reference.

As used herein, the terms "comprises," "comprising," or any other variation thereof are intended to cover a non-exclusive inclusion, such that a process, method, composition, article, or apparatus that comprises a list of elements does not include only those elements but may include other elements not expressly listed or inherent to such process, method, composition, article, or apparatus. The term "exemplary" is used in the sense of "example" rather than "ideal."

As discussed above, the cloud system has to decode a video clip uploaded by a user into raw video data to determine an encoding option that fits the raw video data of the video clip. The raw video data, which is uncompressed original data of the video clip, can include a plurality of raw pictures (also known as frames), each having a size of a few megabytes to dozens of megabytes. Therefore, to analyze each picture of the video clip and determine the fitting encoding option, it can cause the cloud system to spend considerable computation resources and take too much to time to process.

Embodiments of the disclosure provide methods and systems for processing video content to address the above problems. The techniques described in this disclosure have one or more of the following technical effects. In some implementations, the techniques described in this disclosure provide a computer-implemented method for processing video content. The method can include: receiving raw video data of a video; determining a texture complexity for the video based on the raw video data; determining an encoding mode for the raw video data based on the texture complexity; and encoding the raw video data using the determined encoding mode. For example, the texture complexity can be determined by generating a given number of simplified pictures based on the raw video data, performing intra encoding on the given number of simplified pictures, determining a data rate of the intra-encoded simplified pictures, and generating the texture complexity of the raw video data based on the determined data rate. Thus, a size of data to be processed by the cloud system can be significantly reduced.

Figure 1A:
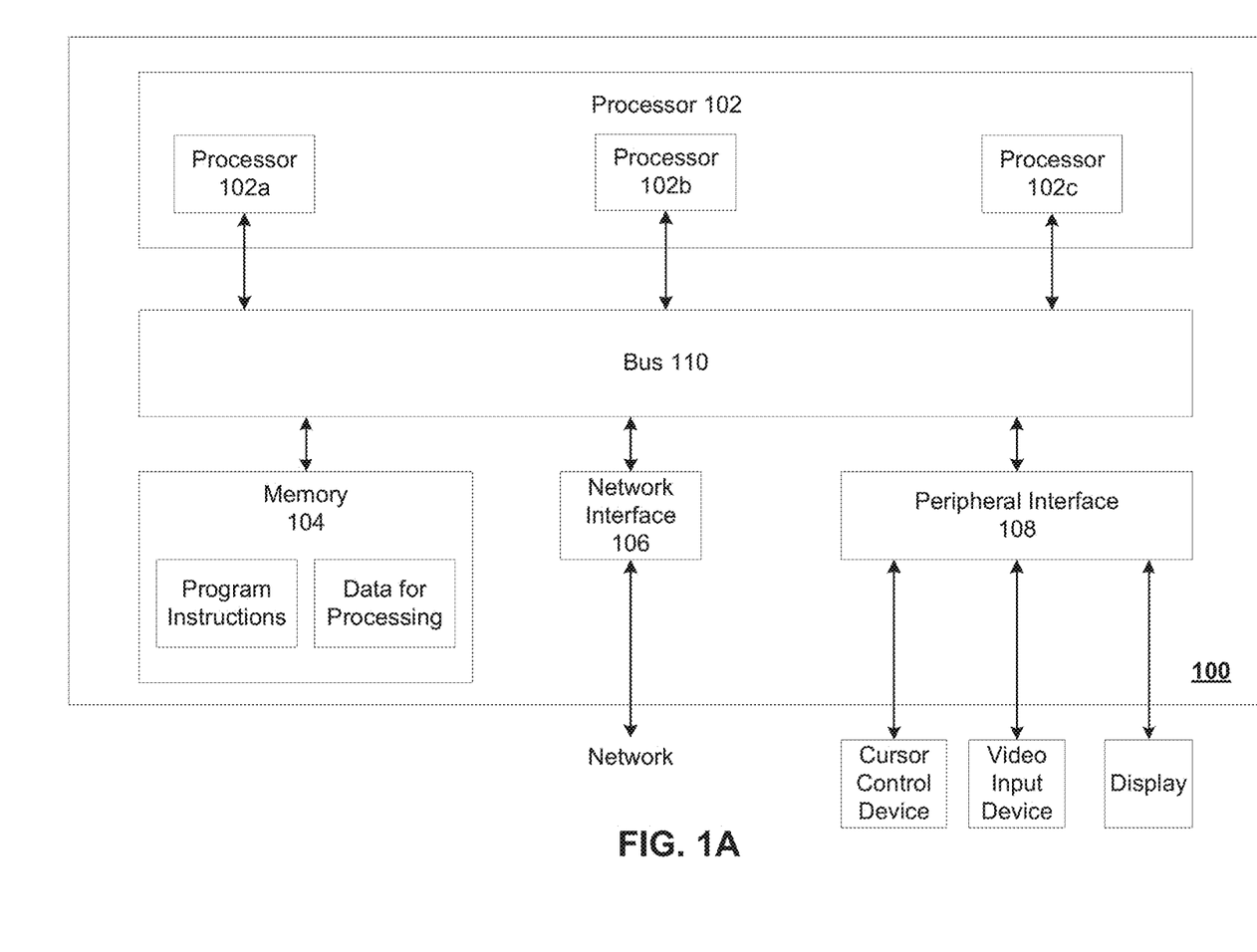
FIG. 1A is a block diagram of an example apparatus for encoding or decoding a video, according to embodiments of this disclosure.

FIG. 1A is a block diagram of an example apparatus 100 for encoding or decoding a video, according to some embodiments of this disclosure. As shown in FIG. 1A, apparatus 100 can include a processor 102, a memory 104, a network interface 106, a peripheral interface 108, and a bus 110.

When processor 102 executes instructions and methods described herein, apparatus 100 can become a specialized machine for video encoding or decoding. Processor 102 can be any type of circuitry capable of manipulating or processing information. For example, processor 102 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 102 can also be a set of processors grouped as a single logical component. For example, as shown in FIG. 1A, processor 102 can include multiple processors, including processor 102a, processor 102b, and processor 102n.

Memory 104 can be configured to store data (e.g., a set of instructions, computer codes, intermediate data, or the like). For example, as shown in FIG. 1A, the stored data can include program instructions (e.g., program instructions for implementing steps of a method for processing video content and data for processing (e.g., a video sequence, video bitstream, or video stream). Processor 102 can access the program instructions and data for processing (e.g., via bus 110), and execute the program instructions to perform an operation or manipulation on the data for processing. Memory 104 can include a high-speed random-access storage device or a non-volatile storage device. In some embodiments, memory 104 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 104 can also be a group of memories (not shown in FIG. 1A) grouped as a single logical component.

Bus 110 can be a communication device that transfers data between components inside apparatus 100, such as an internal bus (e.g., a CPU-memory bus), an external bus (e.g., a universal serial bus port, a peripheral component interconnect express port), or the like.

For ease of explanation without causing ambiguity, processor 102 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 100.

Apparatus 100 can further include network interface 106 to provide wired or wireless communication with a network (e.g., the Internet, an intranet, a local area network, a mobile communications network, or the like). In some embodiments, network interface 106 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 100 can further include peripheral interface 108 to provide a connection to one or more peripheral devices. As shown in FIG. 1A, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., Moving Picture Experts Group (MPEG)-4, High Efficiency Video Coding (HEVC), and Advanced Video Coding (AVC)) can be implemented as any combination of any software or hardware modules in apparatus 100.

Figure 1B:
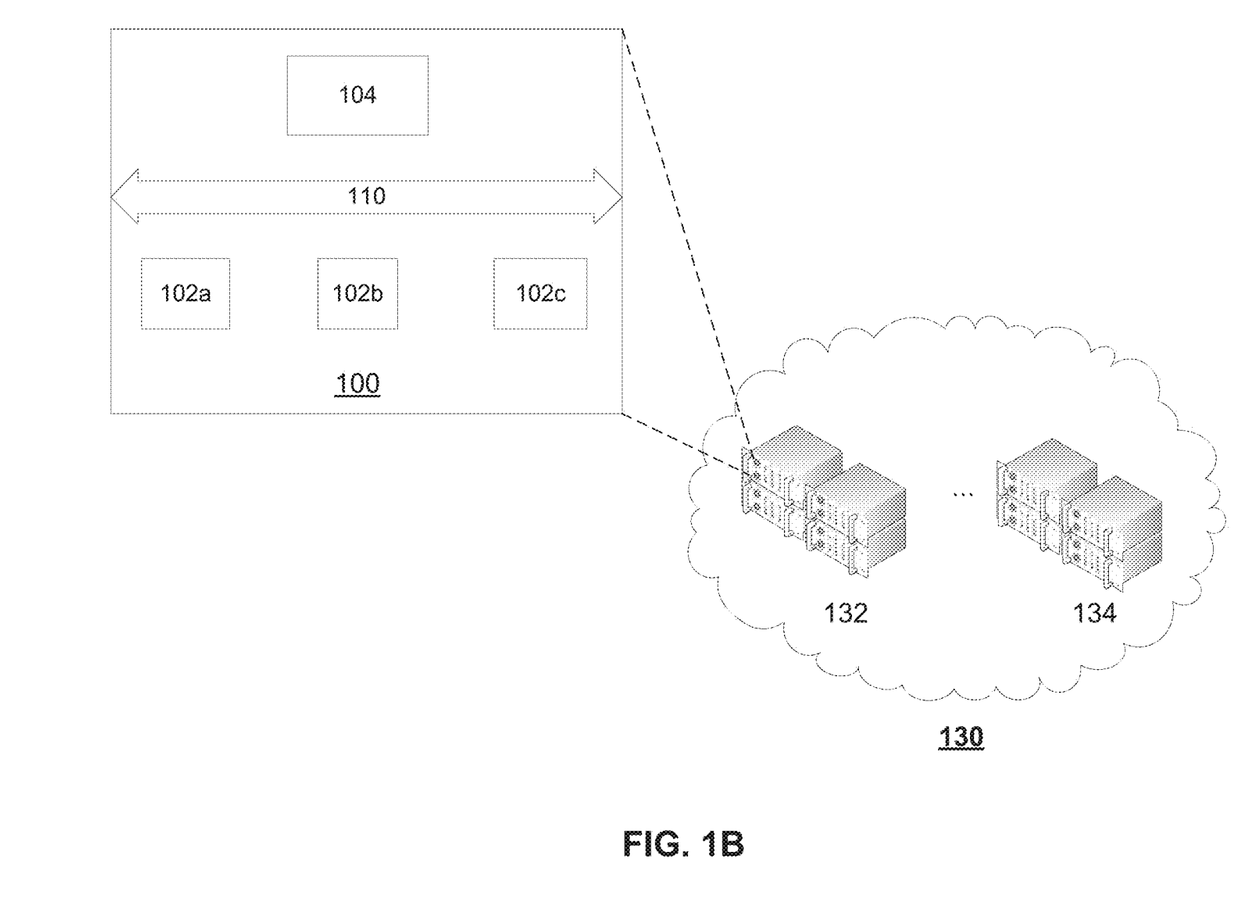
FIG. 1B illustrates a schematic diagram of an exemplary cloud system incorporating an apparatus for encoding or decoding a video, according to embodiments of the disclosure.

FIG. 1B illustrates a schematic diagram of an exemplary cloud system 130 incorporating apparatus 100, according to embodiments of the disclosure.

As shown in FIG. 1B, cloud system 130 (e.g., Ali Cloud) can provide cloud service with artificial intelligence (AI) capabilities, and can include a plurality of computing servers (e.g., 132 and 134). The plurality of computing servers can be grouped physically or virtually in one or more networks that together form cloud system 130. The one or more networks can be private, public, community, or a combination thereof. In some embodiments, a computing server 132 can, for example, apparatus 100 of FIG. 1A. Apparatus 100 is shown in FIG. 1B in a simplified manner for simplicity and clarity.

Figure 1C:
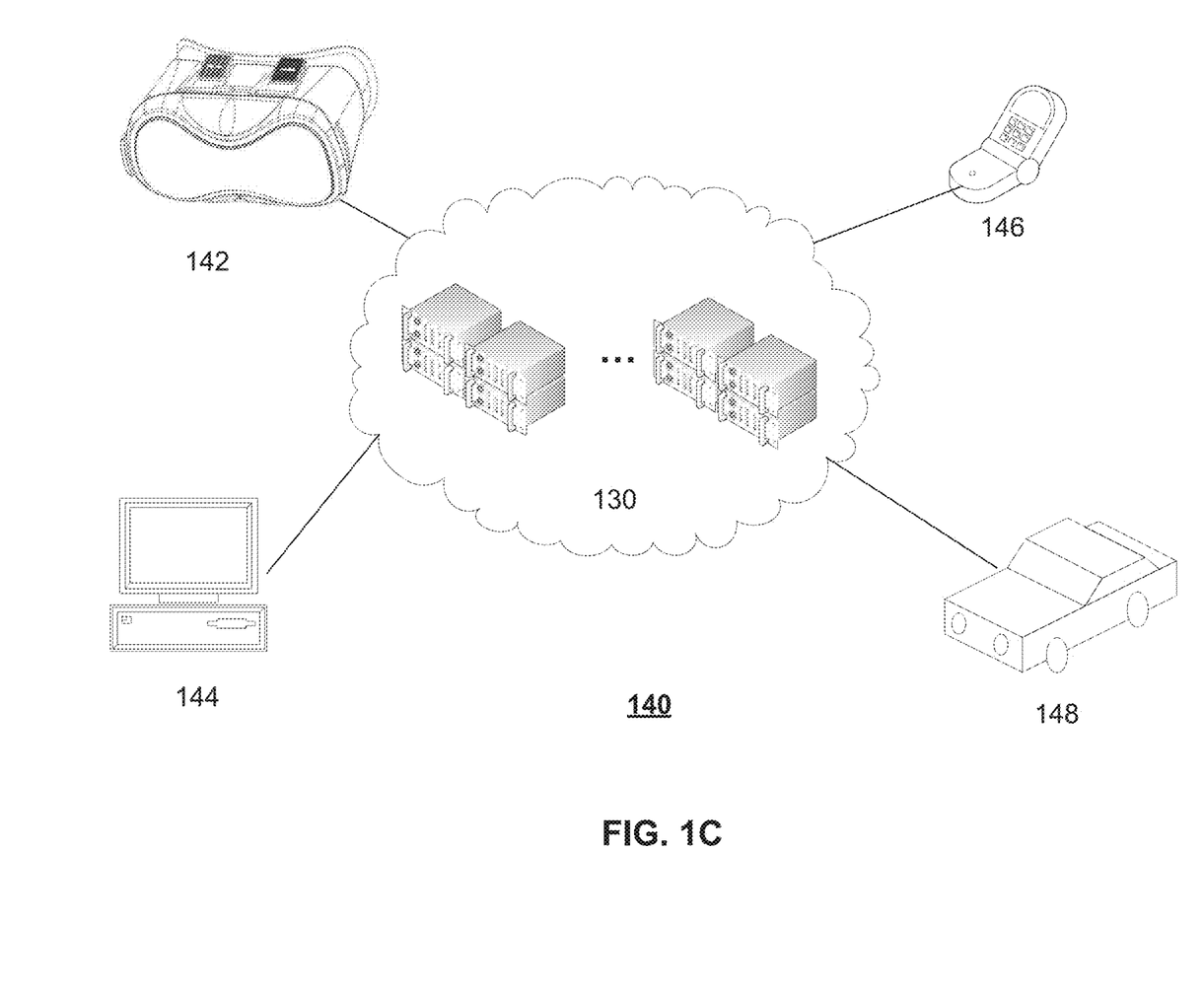
FIG. 1C illustrates a schematic diagram of an exemplary cloud service environment, according to embodiments of the disclosure.

FIG. 1C illustrates a schematic diagram of an exemplary cloud service environment 140, according to embodiments of the disclosure. As shown FIG. 1C, cloud service environment 140 can include cloud system 130 of FIG. 1B and a plurality of user devices 142-148. The plurality of user devices 142-148, for example, can include virtual reality glasses 142, a computer 144, a mobile phone 146, and a car 148. As an example, virtual reality glasses can receive processed video stream from cloud system 130 to create a virtual reality environment for a user. As another example, users of computer 144, mobile phone 146, or car 148 can watch online videos processed by cloud system 130. It is appreciated that the types of user devices 142-148 as shown in FIG. 1C are intended to be illustrative only and cloud system 130 can communicate with any type of computerized device over any type of network in cloud service environment 140.

Figure 2A:
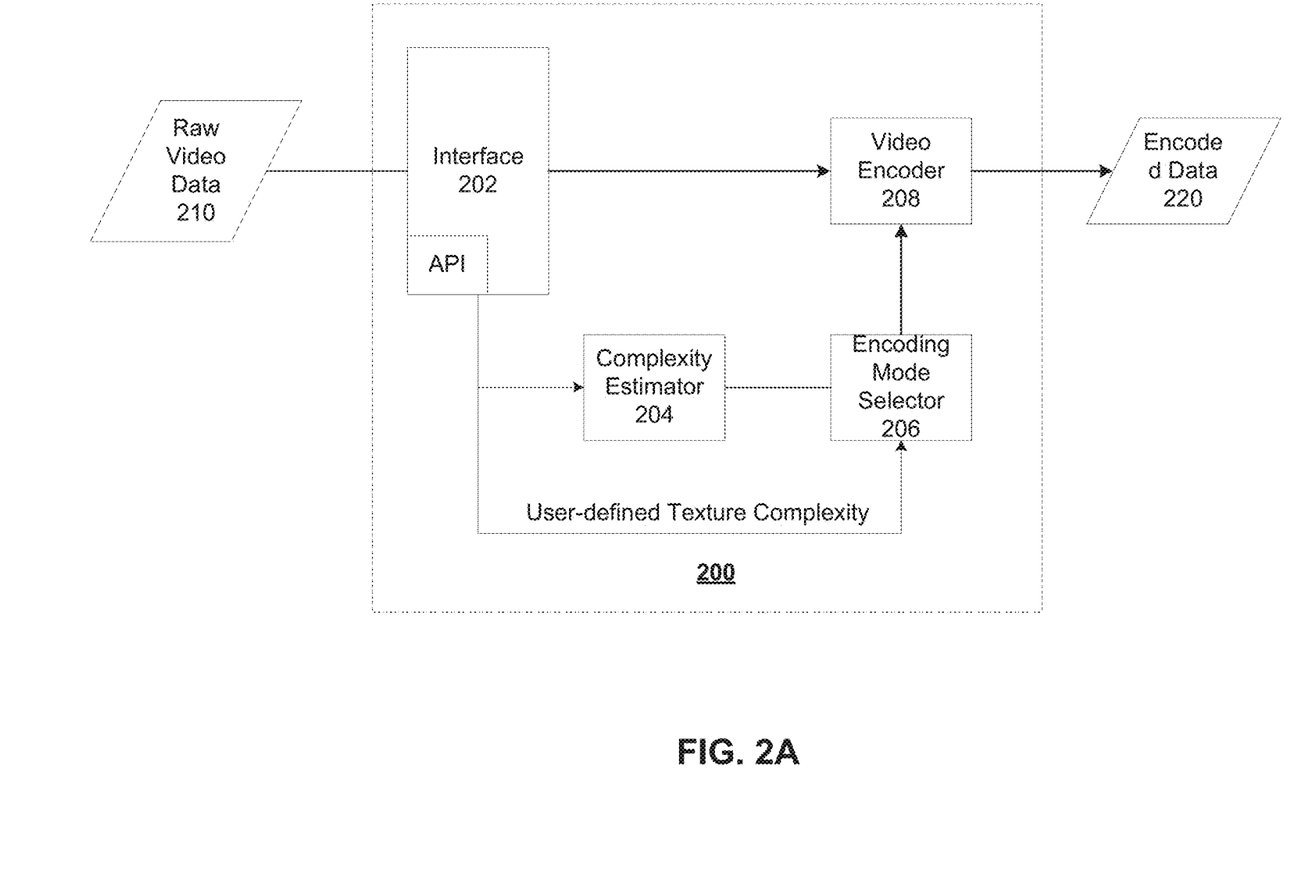
FIG. 2A illustrates a structural diagram of an exemplary system for processing video content, according to embodiments of the disclosure.

FIG. 2A illustrates a structural diagram of a system 200 for processing video content, according to embodiments of the disclosure. System 200 can be a sub-system of cloud system 130 of FIG. 1B, and include an interface 202, a complexity estimator 204, an encoding mode selector 206, and a video encoder 208. It is appreciated that system 200 can be implemented by one or more components of apparatus 100 (e.g., processor 102, network interface 106, peripheral interface 108, or the like).

Interface 202 can be configured to receive raw video data 210. In some embodiments, interface 202 can be implemented by network interface 106 and peripheral interface 108 of FIG. 1A. Raw video data 210 can be generated by decoding e.g., a video clip uploaded to cloud system 130. It is appreciated that a video can be encoded and decoded according to a variety of video coding standards, such as Moving Picture Experts Group (MPEG)-4, High Efficiency Video Coding (HEVC), Advanced Video Coding (AVC), and the like. Therefore, a video clip can be encoded locally by a video encoder that is a user's choice and uploaded to cloud system 130. To determine characteristics of the video clip, the encoded video clip can be decoded into raw video data 210 using a decoder corresponding to the encoder. Accordingly, raw video data 210 can be sent to interface 202 by cloud system 130 after the decoding. Also, raw video data 210 can be sent to interface 202 of system 200 directly from the user, when the user uploads a raw video data.

Figure 2B:
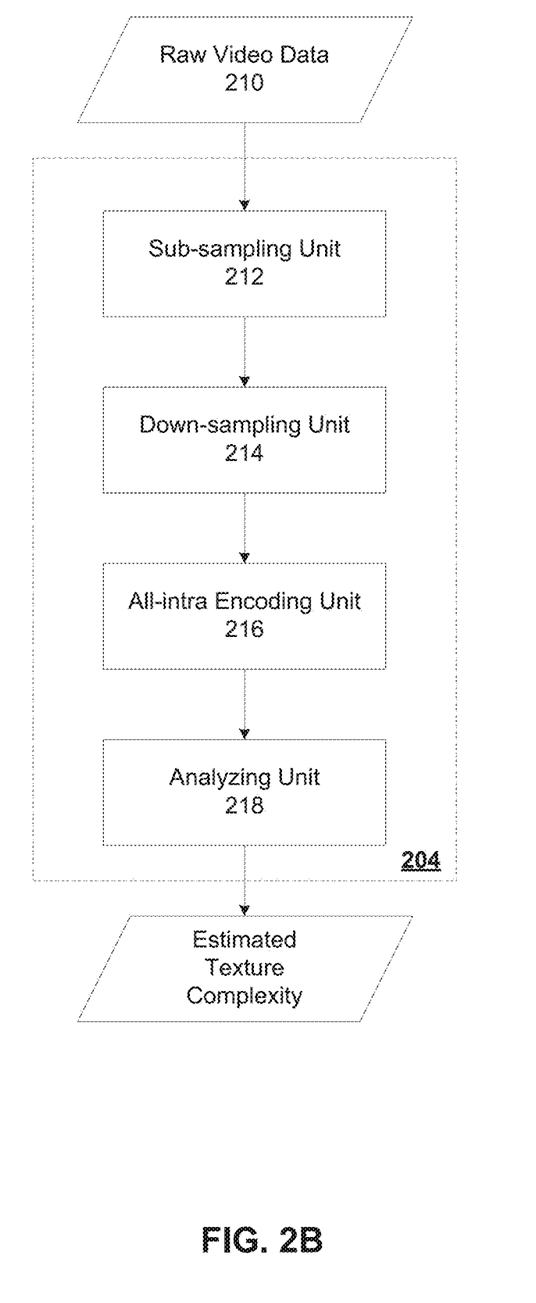
FIG. 2B illustrates a schematic diagram of an exemplary complexity estimator, according to embodiments of the disclosure

As discussed above, the texture complexity can assist the selection of an encoding option for the raw video data. Accordingly, complexity estimator 204 can be configured to determine a texture complexity for the video based on the raw video data. FIG. 2B illustrates a schematic diagram of an exemplary complexity estimator 204, according to embodiments of the disclosure. As shown in FIG. 2B, complexity estimator 204 can include a sub-sampling unit 212, a down-sampling unit 214, an all-intra encoding unit 216, and an analyzing unit 218.

Sub-sampling unit 212 and down-sampling unit 214 can be used to generate a plurality of simplified pictures based on the raw video data. It is appreciated that the raw video data of a video clip can include a plurality of raw pictures (e.g., 6,000 raw pictures for a video clip), and a size of the raw pictures can be a few hundreds of megabytes (MB) or more, which can lay a heavy burden on the computing resources of system 200 for estimating the texture complexity of the video clip. Therefore, the plurality of raw pictures can be "simplified" into a plurality of intermediate pictures for further processing.

Sub-sampling unit 212 can perform sub-sampling on the plurality of raw pictures to select a given number of intermediate pictures.

In some embodiments, the plurality of raw pictures can be sub-sampled at a constant interval. For example, a first frame of every 10 raw pictures can be selected. Also, in some embodiments, the plurality of raw pictures can be sub-sampled at a constant interval with a random shift in each interval. Therefore, as an example, 600 intermediate pictures can be selected from the 6,000 raw pictures.

In some embodiments, the plurality of raw pictures can be sub-sampled by randomly selecting the given number of intermediate pictures. For example, 600 intermediate pictures can be randomly selected from the 6,000 raw pictures.

Down-sampling unit 214 can perform down-sampling on the given number of intermediate pictures to generate the given number of simplified pictures. By down-sampling, a size of an intermediate picture can be reduced. For example, a width and a height of an intermediate picture can be reduced to ¼, respectively, to generate a simplified picture. And therefore, the size of the simplified picture can be 1/16 of the intermediate picture.

Therefore, a plurality of simplified pictures can be generated based on the raw video data, by e.g., sub-sampling and down-sampling. It is appreciated that, in some embodiments, only one of the sub-sampling and the down-sampling may be used.

All-intra encoding unit 216 can be used to perform intra-encoding (also known as, intra-frame encoding) on the plurality of simplified pictures. As inter-encoding (also known as, inter-frame encoding) of a target picture (e.g., a simplified picture) can introduce additional data associated with motions among adjacent pictures, a size of an inter-encoded picture is not only related to the target picture but also related to adjacent pictures. Therefore, inter-encoding cannot truly reflect characteristics of the target picture. Thus, all of the plurality of simplified pictures can be intra-encoded. By all-intra encoding these simplified pictures, a size of an encoded picture is only related to a corresponding simplified picture itself. Therefore, the size of the encoded picture and a bit rate of the plurality of intra-encoded pictures can truly reflect the texture complexity of raw video data 210, without being influenced by the motions among adjacent pictures.

Analyzing unit 218 can be used to analyze the intra-encoded pictures to determine the texture complexity of raw video data 210. In some embodiments, analyzing unit 218 can determine a data rate of the intra-encoded simplified pictures, and generate the texture complexity of the raw video data based on the determined data rate. For example, a texture complexity of an exemplary raw video data can score 75 based on a data rate of 5 megabytes per second (5 MB/s). In some embodiments, a score of the texture complexity of a raw video data can be normalized within a given range (e.g., 1-100) based on a plurality of raw video datum that have been received by system 200. Therefore, with time lapse and more raw video datum received by system 200, a raw video data with a same texture complexity may be scored differently at different times.

In addition to the generation of the texture complexity based on the raw video data of a video, a user of system 200, who uploads a video to the cloud system, can also define a texture complexity for the video uploaded by the user through interface 202. With reference back to FIG. 2A, in some embodiments, interface 202 can be configured to provide a complexity indicator application programming interface (API) for receiving additional information (e.g., a texture complexity) associated with the raw video data. For example, a user can upload a video to e.g., cloud system 130 and indicate a user-defined texture complexity of the video via the complexity indicator API. As shown in FIG. 2A, interface 202 can transmit the user-defined texture complexity to encoding mode selector 206 for further processing.

Therefore, the texture complexity can be either generated by system 200 or indicated by a user. Based on the generated texture complexity, encoding mode selector 206 can determine an encoding mode for raw video data 210. An encoding mode can include a set of encoding parameters. For example, with a texture complexity score at 75, the following parameters can be applied for encoding the raw video data.

--- ffmpeg -y -i input_file -x264-params ssim=1:aq-mode=1:bframes=2:b-adapt=0:b-bias=1:b-pyramid=1:ref=5:qpstep=4:ipratio=1.7:pbratio=1.6:aq-strength=0.1:qcomp=0.4:weightb=0:weightp=0:me=dia:subme=8:mixed-refs=1:8x8dct=1:trellis=1:no-fast-pskip=0:no-dct-decimate=0:nr=0:threads=10:chroma-me=1:lookahead_threads=5:rc_lookahead=40:psy=0:mbtree=1:open_gop=0:chroma-qp-offset=3:no-deblock=0 -b:v 1.5M -maxrate 3.0M -bufsize 6.0M -vsync 0 -psnr -an -max_muxing_queue_size 1024 out_file.mp4

---

The above set of parameters can include, for example, a structural similarity index "ssim", a flag for adaptive quantization mode ("aq-mode"), a number of B frames "bframes", a maximum data rate "-maxrate", or a buffer size "-bufsize."

Also, the encoding mode can include applying a denoising filter before encoding. For example, with a texture complexity score at 75, the denoising filter can be applied before encoding.

Then, video encoder 208 can encode raw video data 210 into encoded data 220 using the above determined encoding mode (e.g., the above parameters and the denoising filter). Encoded data 220 can be then further distributed to users or stored.

By applying the above-described system 200, the data rate of the all-intra encoded pictures, which are used to evaluate the texture complexity, can be less than 3% of the data rate of the raw video data. In other words, the computing resources occupied by the evaluation can be reduced. And the texture complexity determined based on the all-intra encoded pictures only deviates 10% from the texture complexity determined based on the raw video data. Thus, the above-described system 200 can significantly improve the efficiency of determining the texture complexity of a video without losing accuracy.

Figure 3:
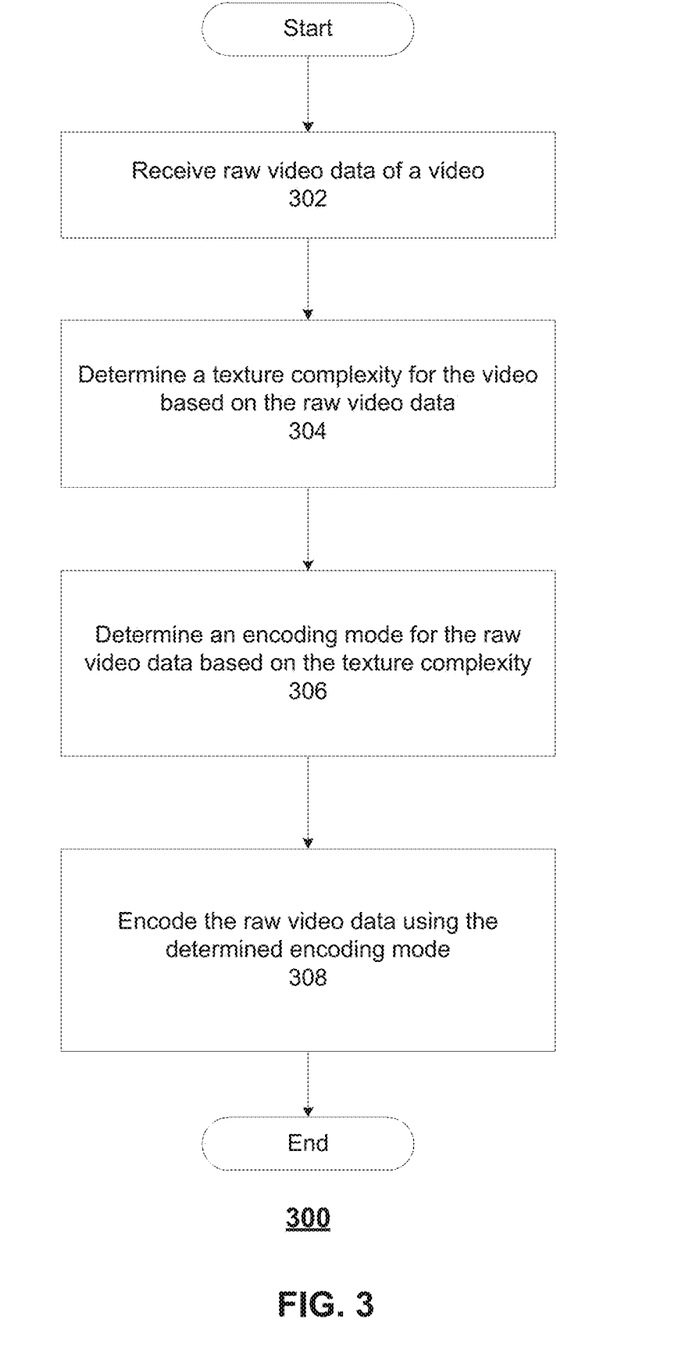
FIG. 3 illustrates a flowchart of an exemplary computer-implemented method for processing video content, according to embodiments of the disclosure.

FIG. 3 illustrates a flowchart of an exemplary computer-implemented method 300 for processing video content, according to embodiments of the disclosure. Method 300 can be implemented by, for example, system 200 of FIGS. 2A-2B. Method 300 can include steps as below.

At step 302, raw video data of a video can be received. As discussed above, the raw video data (e.g., raw video data 210) can be generated by decoding a video uploaded to a cloud system (e.g., cloud system 130 of FIG. 1B), and system 200 can be part of the cloud system.

Figure 4:
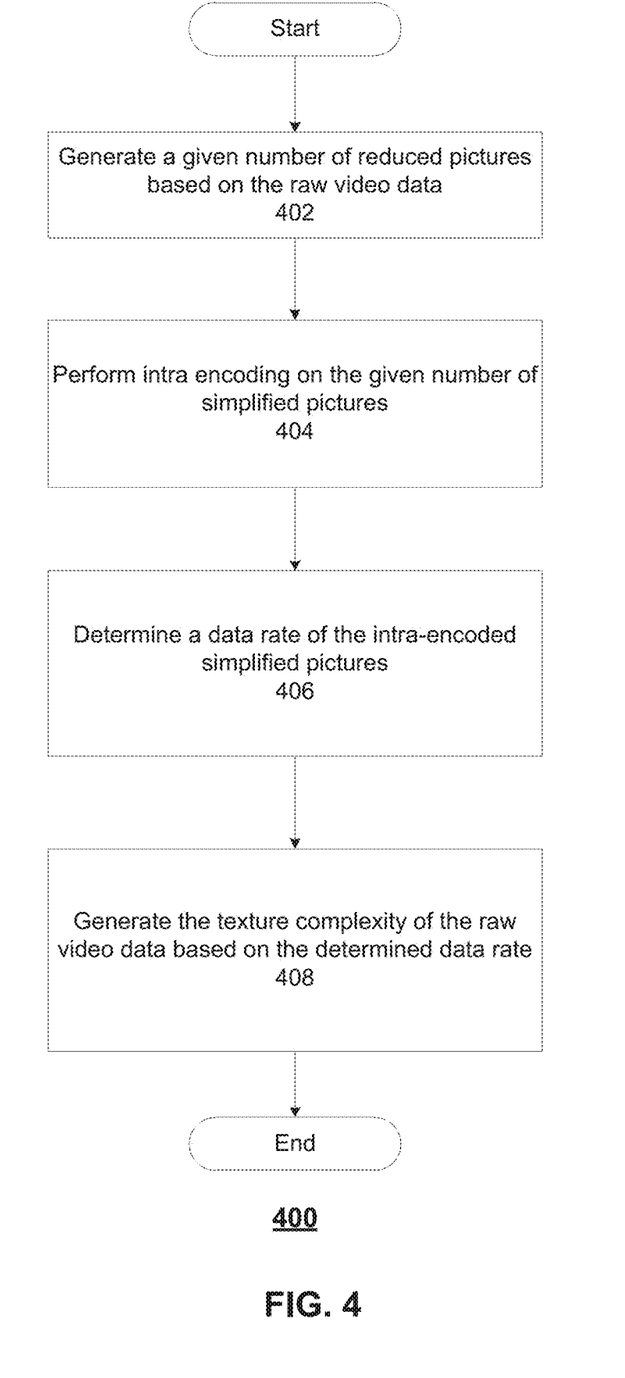
FIG. 4 illustrates an exemplary method for determining a texture complexity, according to embodiments of the disclosure.

At step 304, a texture complexity for the video can be determined based on the raw video data. FIG. 4 illustrates a flowchart of an exemplary method 400 for determining a texture complexity, according to embodiments of the disclosure. Method 400 can be implemented independently or as part of method 300. Method 400 can include the following steps.

At step 402, a given number of simplified pictures can be generated based on the raw video data. It is appreciated that raw video data of a video can include a plurality of raw pictures. The raw pictures of a video with a high definition can have a large size, which can impose a burden on the computing resources of e.g., system 200. Therefore, at step 402, only a given number of simplified pictures can be generated for further processing. In some embodiments, the plurality of raw picture can be sub-sampled to select the given number of intermediate pictures. The sub-sampling can include sub-sampling the plurality of raw picture at a constant interval, or randomly selecting the given number of intermediate pictures. Then, the given number of intermediate pictures can be down sampled to generate the given number of reduced pictures. By down sampling the intermediate pictures, a size of a simplified picture can be significantly reduced.

At step 404, intra encoding can be performed on the given number of simplified pictures. As discussed above, inter-encoding can introduce additional data related to motions among adjacent pictures to an encoded picture. Intra encoding can be applied to all of the given number of simplified pictures to ensure that a size of encoded picture is only related to the complexity of the raw picture corresponding to the encoded picture.

At step 406, a data rate of the intra-encoded simplified pictures can be determined. Accordingly, after the intra-encoding, the data rate of the intra-encoded simplified pictures can be determined based on a size of each intra-encoded simplified picture.

At step 408, the texture complexity of the raw video data can be generated based on the determined data rate. For example, a texture complexity of an exemplary raw video data can score 75 based on a data rate of 5 megabytes per second (5 MB/s). In some embodiments, the texture complexity can be determined based on the determined data rate using, e.g., a look-up table. In some embodiments, the texture complexity can be determined dynamically. For example, system 200 can receive a plurality of videos, and determine a plurality of texture complexities for the plurality of videos, respectively. And the plurality of texture complexities can be normalized to fall within a given range (e.g., 1-100). Therefore, with time lapse and more raw video datum received by system 200, a raw video data with a same texture complexity may be scored differently at different times. In some embodiments, the texture complexity can be generated based on the determined data rate using a machine learning model. The machine learning model can be trained in advance.

It is appreciated that a user-defined texture complexity associated with the raw video data can be received and used directly.

With reference back to FIG. 3, at step 306, an encoding mode for the raw video data can be determined based on the texture complexity. The encoding mode is associated with a set of encoding parameters. For example, with a texture complexity scored at 75, a given set of parameters can be applied for encoding the raw video data. As discussed above, the set of parameters comprises at least one of: a structural similarity index, a flag for adaptive quantization mode, a number of B frames, a maximum data rate, or a buffer size. In some embodiments, a denoising filter can also be applied before the encoding, when the texture complexity satisfies a given condition (e.g., a texture complexity being scored at 75).

At step 308, the raw video data can be encoded using the determined encoding mode. The encoded data can be distributed to users or stored in the cloud system.

Embodiments of the disclosure also provide a computer program product. The computer program product may include a non-transitory computer readable storage medium having computer readable program instructions thereon for causing a processor to carry out the above-described methods.

The computer readable storage medium may be a tangible device that can store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object-oriented programming language, and conventional procedural programming languages. The computer readable program instructions may execute entirely on a computer system as a stand-alone software package, or partly on a first computer and partly on a second computer remote from the first computer. In the latter scenario, the second, remote computer may be connected to the first computer through any type of network, including a local area network (LAN) or a wide area network (WAN).

The computer readable program instructions may be provided to a processor of a computer, or other programmable data processing apparatus to produce a machine, such that the instructions, which execute via the processor of the computer or other programmable data processing apparatus, create means for implementing the above-described methods.

The embodiments may further be described using the following clauses.

1. A computer-implemented method for processing video content, comprising:
  receiving raw video data of a video;
  determining a texture complexity for the video based on the raw video data;
  determining an encoding mode for the raw video data based on the texture complexity; and
  encoding the raw video data using the determined encoding mode.

2. The method according to clause 1, wherein determining the texture complexity for the video further comprises:
  generating a given number of simplified pictures based on the raw video data;
  performing intra encoding on the given number of simplified pictures;
  determining a data rate of the intra-encoded simplified pictures; and
  generating the texture complexity of the raw video data based on the determined data rate.

3. The method according to clause 2, wherein the raw video data comprises a plurality of raw pictures, and generating the given number of simplified pictures based on the raw video data further comprises:
  sub-sampling the plurality of raw picture to select the given number of intermediate pictures.

4. The method according to clause 3, wherein generating the given number of simplified pictures based on the raw video data further comprises:
  down-sampling the given number of intermediate pictures to generate the given number of simplified pictures.

5. The method according to any one of clauses 1-4, wherein determining the texture complexity for the video further comprises:
  receiving a user-defined texture complexity associated with the raw video data.

6. The method according to any one of clauses 1-5, wherein the encoding mode is associated with a set of encoding parameters.

7. The method according to clause 6, wherein the set of parameters comprises at least one of:
  a structural similarity index, a flag for adaptive quantization mode, a number of B frames, a maximum data rate, or a buffer size.

8. The method according to any one of clauses 1-7, wherein the encoding mode is further associated with applying a denoising filter before the encoding, when the texture complexity satisfies a given condition.

9. The method according to any one of clauses 1-8, further comprising:
  receiving a plurality of videos; and
  determining a plurality of texture complexities for the plurality of videos, respectively, wherein
  the plurality of texture complexities are normalized to fall within a given range.

10. The method according to clause 3 or 4, wherein sub-sampling the plurality of raw picture to select the given number of intermediate pictures further comprises:
  sub-sampling the plurality of raw picture at a constant interval; or
  randomly selecting the given number of intermediate pictures.

11. A system for processing video content, comprising:
  a memory for storing a set of instructions; and
  at least one processor configured to execute the set of instructions to cause the system to:
    receive raw video data of a video;
    determine a texture complexity for the video based on the raw video data;
    determine an encoding mode for the raw video data based on the texture complexity; and
    encode the raw video data using the determined encoding mode.

12. The system according to clause 11, wherein in determining the texture complexity for the video, the at least one processor is configured to execute the set of instruction to cause the system to:
  generate a given number of simplified pictures based on the raw video data;
  perform intra encoding on the given number of simplified pictures;
  determine a data rate of the intra-encoded simplified pictures; and
  generate the texture complexity of the raw video data based on the determined data rate.

13. The system according to clause 12, wherein the raw video data comprises a plurality of raw pictures, and in generating the given number of simplified pictures based on the raw video data, the at least one processor is configured to execute the set of instruction to cause the system to:
  sub-sample the plurality of raw picture to select the given number of intermediate pictures.

14. The system according to clause 13, wherein in generating the given number of simplified pictures based on the raw video data, the at least one processor is configured to execute the set of instruction to cause the system to:
  down-sample the given number of intermediate pictures to generate the given number of simplified pictures.

15. The system according to any one of clauses 11-14, wherein in determining the texture complexity for the video, the at least one processor is configured to execute the set of instruction to cause the system to:
  receive a user-defined texture complexity associated with the raw video data.

16. The system according to any one of clauses 11-15, wherein the encoding mode is associated with a set of encoding parameters.

17. The system according to clause 16, wherein the set of parameters comprises at least one of:

a structural similarity index, a flag for adaptive quantization mode, a number of B frames, a maximum data rate, or a buffer size.

18. The system according to any one of clauses 11-17, wherein the encoding mode is further associated with applying a denoising filter before the encoding, when the texture complexity satisfies a given condition.

19. The system according to any one of clauses 11-18, wherein the at least one processor is configured to execute the set of instruction to cause the system to:
receive a plurality of videos; and
determine a plurality of texture complexities for the plurality of videos, respectively, wherein
the plurality of texture complexities are normalized to fall within a given range.

20. A non-transitory computer readable medium that stores a set of instructions that is executable by at least one processor of a computer system to cause the computer system to perform a method for processing video content, the method comprising:
receiving raw video data of a video;
determining a texture complexity for the video based on the raw video data;
determining an encoding mode for the raw video data based on the texture complexity; and
encoding the raw video data using the determined encoding mode.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not to be considered essential features of those embodiments, unless the embodiment is inoperative without those elements.

Although the specification has been described in conjunction with specific embodiments thereof, it is evident that many alternatives, modifications and variations will be apparent to those skilled in the art. For example, although some embodiments are described using processing of a matrix of input data as an example, the described systems and methods can be applied to any parallel computation tasks. Accordingly, it is intended to embrace all such alternatives, modifications and variations that fall within the spirit and broad scope of the appended claims.

What is claimed is:

1. A computer-implemented method for processing video content, comprising:
receiving raw video data of a video, the raw video data comprising a plurality of raw pictures;
determining a texture complexity for the video using a given number of simplified pictures generated based on the raw video data, each of the given number of simplified pictures having at least one of a reduced width or a reduced height compared with corresponding picture of the raw video data, wherein determining the texture complexity comprises:
generating the given number of the simplified pictures based on the raw video data, the generating the given number of the simplified pictures comprising sub-sampling the plurality of raw pictures by randomly selecting a given number of intermediate pictures from the plurality of raw pictures;
determining an encoding mode for the raw video data based on the texture complexity; and
encoding the raw video data using the determined encoding mode.

2. The method according to claim 1, wherein determining the texture complexity for the video further comprises:
performing intra encoding on the given number of simplified pictures;
determining a data rate of the intra-encoded simplified pictures; and
generating the texture complexity of the raw video data based on the determined data rate.

3. The method according to claim 1, wherein generating the given number of simplified pictures based on the raw video data further comprises:
down-sampling the given number of intermediate pictures to generate the given number of simplified pictures.

4. The method according to claim 1, wherein determining the texture complexity for the video further comprises:
receiving a user-defined texture complexity associated with the raw video data.

5. The method according to claim 1, wherein the encoding mode is associated with a set of encoding parameters.

6. The method according to claim 5, wherein the set of parameters comprises at least one of:
a structural similarity index, a flag for adaptive quantization mode, a number of B frames, a maximum data rate, or a buffer size.

7. The method according to claim 1, wherein the encoding mode is further associated with applying a denoising filter before the encoding, when the texture complexity satisfies a given condition.

8. The method according to claim 1, further comprising:
receiving a plurality of videos; and
determining a plurality of texture complexities for the plurality of videos, respectively, wherein
the plurality of texture complexities are normalized to fall within a given range.

9. A system for processing video content, comprising:
a memory for storing a set of instructions; and
at least one processor configured to execute the set of instructions to cause the system to:
receive raw video data of a video, the raw video data comprising a plurality of raw pictures;
determine a texture complexity for the video using a given number of simplified pictures generated based on the raw video data, each of the given number of simplified pictures having at least one of a reduced width or a reduced height compared with corresponding picture of the raw video data, wherein determining the texture complexity comprises:
generating the given number of the simplified pictures based on the raw video data, the generating the given number of the simplified pictures comprising sub-sampling the plurality of raw pictures by randomly selecting a given number of intermediate pictures from the plurality of raw pictures;
determine an encoding mode for the raw video data based on the texture complexity; and
encode the raw video data using the determined encoding mode.

10. The system according to claim 9, wherein in determining the texture complexity for the video, the at least one processor is configured to execute the set of instruction to cause the system to:
perform intra encoding on the given number of simplified pictures;
determine a data rate of the intra-encoded simplified pictures; and
generate the texture complexity of the raw video data based on the determined data rate.

11. The system according to claim 9, wherein in generating the given number of simplified pictures based on the raw video data, the at least one processor is configured to execute the set of instruction to cause the system to:
down-sample the given number of intermediate pictures to generate the given number of simplified pictures.

12. The system according to claim 9, wherein in determining the texture complexity for the video, the at least one processor is configured to execute the set of instruction to cause the system to:
receive a user-defined texture complexity associated with the raw video data.

13. The system according to claim 9, wherein the encoding mode is associated with a set of encoding parameters.

14. The system according to claim 13, wherein the set of parameters comprises at least one of:

a structural similarity index, a flag for adaptive quantization mode, a number of B frames, a maximum data rate, or a buffer size.

15. The system according to claim 9, wherein the encoding mode is further associated with applying a denoising filter before the encoding, when the texture complexity satisfies a given condition.

16. The system according to claim 9, wherein the at least one processor is configured to execute the set of instruction to cause the system to:
receive a plurality of videos; and
determine a plurality of texture complexities for the plurality of videos, respectively, wherein
the plurality of texture complexities are normalized to fall within a given range.

17. A non-transitory computer readable medium that stores a set of instructions that is executable by at least one processor of a computer system to cause the computer system to perform a method for processing video content, the method comprising:
receiving raw video data of a video, the raw video data comprising a plurality of raw pictures;
determining a texture complexity for the video using a given number of simplified pictures generated based on the raw video data, each of the given number of simplified pictures having at least one of a reduced width or a reduced height compared with corresponding picture of the raw video data; wherein determining the texture complexity further comprises:
generating the given number of the simplified pictures based on the raw video data, the generating the given number of the simplified pictures comprising sub-sampling the plurality of raw pictures by randomly selecting a given number of intermediate pictures from the plurality of raw pictures;
determining an encoding mode for the raw video data based on the texture complexity; and
encoding the raw video data using the determined encoding mode.

* * * * *